Patented Feb. 9, 1937

2,069,861

UNITED STATES PATENT OFFICE 2,069,861

α-ALKYLIDENE AND α-ALKYL CYCLOPENTANONE

Alexander St. Pfau, Geneva, Switzerland, assignor to Givaudan-Delawanna, Inc., New York, N. Y., a corporation of New York No Drawing. Application October 16, 1934, Serial No. 748,455. In Germany October 16, 1933

4 Claims. (Cl. 260—131)

I have found that cyclopentanones can be condensed with higher saturated or unsaturated aldehydes to alkylidene cyclopentanones if proper conditions are selected. These new compounds are valuable aromatics, and have a pleasing olefactory odor suitable for perfumes. Cyclopentanones with at least one methylene group in the alpha position and aliphatic saturated or unsaturated normal or branch chain aldehydes with 4 to 10 carbon atoms can be used. The condensation of the two components is effected by the usual alkaline reagents.

The result is either directly the unsaturated ketone or the corresponding β-oxyketone which by splitting off water can be transformed into the unsaturated ketone. The products so obtained can be purified either by distillation or by chemical methods, for instance, by the semicarbazones.

By hydrogenation of the so obtained unsaturated ketones the corresponding saturated ketones can be obtained which are also useful as aromatics.

Example #1

| | Kilo. |
|---|---|
| Cyclopentanone | 1 |
| Ether | .6 |
| 15% Caustic soda | 1 | are cooled to zero and 1.5 kilo. heptyl aldehyde are added. This gives β-oxyketone:

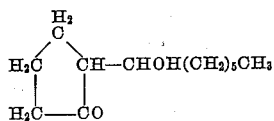

When the reaction is completed water is added, the mixture is acidulated, the reaction product separated and distilled in vacuo in the presence of a substance which splits off water, as for instance oxalic acid.

After careful fractionation a middle fraction of about 5 kilo. of α-heptylidene cyclopentanone of the following formula—

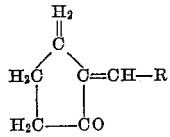

is obtained, in which the "R" means $C_6H_{13}$. The product is a colorless liquid. Boiling point 144° (10 mm.), $d_{20o}:0,911$; $n^D{}_{20o}:1,479$; semicarbazone mp. 185–186°.

Example #2

To a solution of

| | Kilo. |
|---|---|
| Cyclopentanone | 1 |
| Alcohol | 1 |
| Heptyl aldehyde | .7 |
| Caustic soda 35% | .05 | are added slowly under agitation at −10° C. When the reaction is finished the product is worked up as in Example #1. The yield amounts to 0.5 kilo. of the same product as in Example #1.

Example #3

If caproic aldehyde is condensed with cyclopentanone in either ether or alcohol, one obtains α-hexylidene cyclopentanone of the general formula in Example #1 in which "R" represents $C_5H_{11}$. The boiling point is 125° (10 mm.), $d_{20o}:0,915$; $n^D{}_{20o}:1,480$; semicarbazone mp. 186–187°.

Example #4

If caprylic aldehyde is used with either solvent α-octylidene cyclopentanone is obtained. Its composition is represented by the above formula if "R" is $C_7H_{15}$. The boiling point is 165° (10), $d_{20o}:0,905$; $n^D{}_{20o}:1,478$; semicarbazone mp. 184–185°.

Example #5

Catalytic hydrogenation of α-heptylidene-cyclopentanone furnished α-heptyl cyclopentanone of the formula—

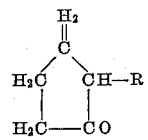

where "R" represents $C_7H_{15}$. Boiling point 130° (10 mm.); $n^D{}_{20o}:1,453$; semicarbazone mp. 184–185°.

Example #6

In an analogous manner hexylidene-cyclopentanone when hydrogenated gives α-hexyl cyclopentanone of the formula mentioned in Example #5 if "R"=C₆H₁₃. The boiling point is 118° (10 mm.); $d_{20^\circ}$:0,887; $n^D_{20^\circ}$:1,450; semi-carbazone mp. 186–187°.

The invention claimed is:

1. A cyclopentanone mono-substituted in the α-position by a radical selected from the group consisting of alkyl and alkylidene radicals having from 4 to 10 carbon atoms.
2. α-heptylidene cyclopentanone.
3. α-heptylcyclopentanone.
4. α-hexylidene-cyclopentanone.

ALEXANDER ST. PFAU.